United States Patent [19]

Rosene et al.

[11] Patent Number: 5,575,168
[45] Date of Patent: Nov. 19, 1996

[54] WORKPIECE-DEFORMING TOOL AND DIE FOR USE IN A PUNCH PRESS

[75] Inventors: Ronald G. Rosene, Coon Rapids; Richard L. Timp, Vadnais Heights, both of Minn.

[73] Assignee: Wilson Tool International, Inc., White Bear Lake, Minn.

[21] Appl. No.: 370,144

[22] Filed: Jan. 9, 1995

Related U.S. Application Data

[63] Continuation-in-part of Ser. No. 177,691, Jan. 12, 1994.

[51] Int. Cl.⁶ ............................................. B21D 5/14
[52] U.S. Cl. ........................ 72/179; 72/182; 72/442
[58] Field of Search .................. 72/442, 179, 182, 72/175, 226; 83/549

[56] References Cited

U.S. PATENT DOCUMENTS

| | | | |
|---|---|---|---|
| D. 325,046 | 3/1992 | Liguori . | |
| 1,199,715 | 9/1916 | Schmidt . | |
| 1,837,629 | 12/1931 | Newton . | |
| 1,997,871 | 4/1935 | Miller et al. . | |
| 2,341,215 | 8/1944 | Hackbarth . | |
| 2,364,735 | 12/1944 | Mcglone et al. | 72/179 |
| 2,486,147 | 10/1949 | Fuller . | |
| 2,832,395 | 4/1958 | Fisher | 72/175 |
| 3,053,304 | 9/1962 | MacNaughton et al. . | |
| 3,184,942 | 5/1965 | Cookson . | |
| 3,203,214 | 8/1965 | Fraenkel . | |
| 3,318,130 | 5/1967 | Sendzimir | 72/226 |
| 3,333,451 | 8/1967 | Inlow . | |
| 3,683,663 | 8/1972 | Diolot . | |
| 3,938,362 | 2/1976 | Falk et al. | 72/238 |
| 4,048,830 | 9/1977 | Elsner | 72/175 |
| 4,166,370 | 9/1979 | Goodman | 72/105 |
| 4,299,643 | 11/1981 | Cross . | |
| 4,311,403 | 1/1982 | Liguori . | |
| 4,665,607 | 5/1987 | Ressencourt | 83/549 |
| 4,689,261 | 8/1987 | Ahnström . | |
| 4,726,210 | 2/1988 | Weil et al. | 72/133 |
| 5,107,695 | 4/1992 | Vandenbroucke | 72/129 |
| 5,156,034 | 10/1992 | Lorbach | 72/20 |

FOREIGN PATENT DOCUMENTS

| | | |
|---|---|---|
| 1040081 | 10/1953 | France ........................ 72/175 |
| 1281372 | 1/1962 | France . |
| 2247021 | 10/1990 | Japan . |
| 5042333 | 2/1993 | Japan . |
| 05245544 | 9/1993 | Japan . |

*Primary Examiner*—David Jones
*Attorney, Agent, or Firm*—Fredrikson & Byron

[57] ABSTRACT

A self-locking workpiece-deforming tool for use in mechanical punch presses in which the ram cannot maintain continuous pressure against the tool in a depressed position. The tool includes an elongated punch guide having an interior surface defining a chamber extending therethrough. A punch body having upper and lower segments is partially received within the chamber for reciprocable axial movement with respect to the guide between raised and depressed positions. A lower segment of the punch body carries a rotatable workpiece-deforming roller. The punch assembly includes a positioning device for sustaining the body and the roller in a depressed position without requiring the ram of the press to exert continuous downward pressure on the tool. The positioning means locks the body in the roller in the depressed position upon a momentary strike by the ram, and releases the body and roller upon subsequent momentary strike by the ram.

7 Claims, 14 Drawing Sheets

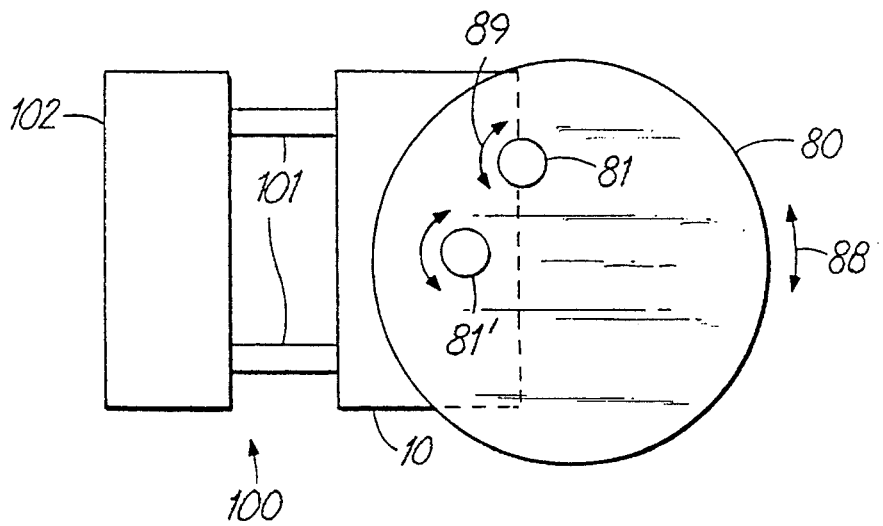
FIG. 5
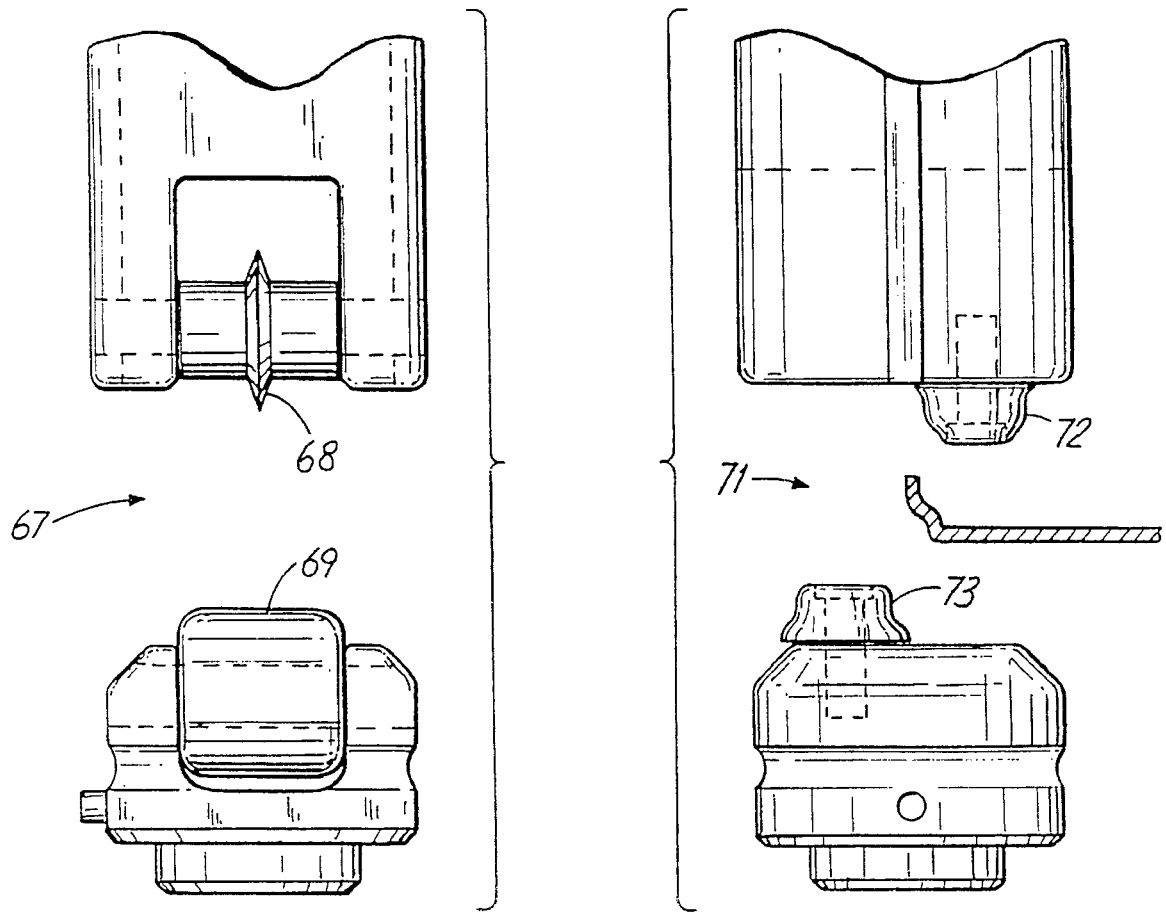
FIG. 6
FIG. 8

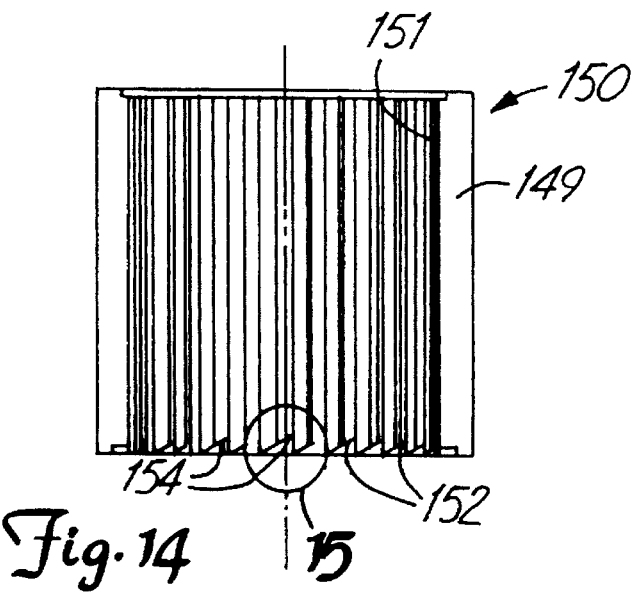
Fig. 14
15
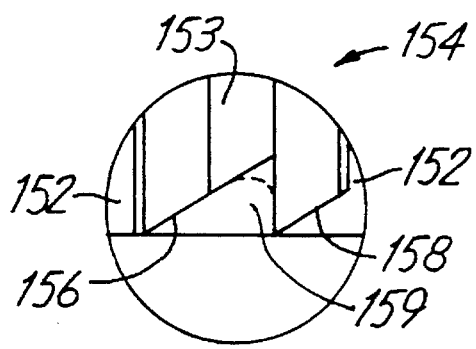
Fig. 15
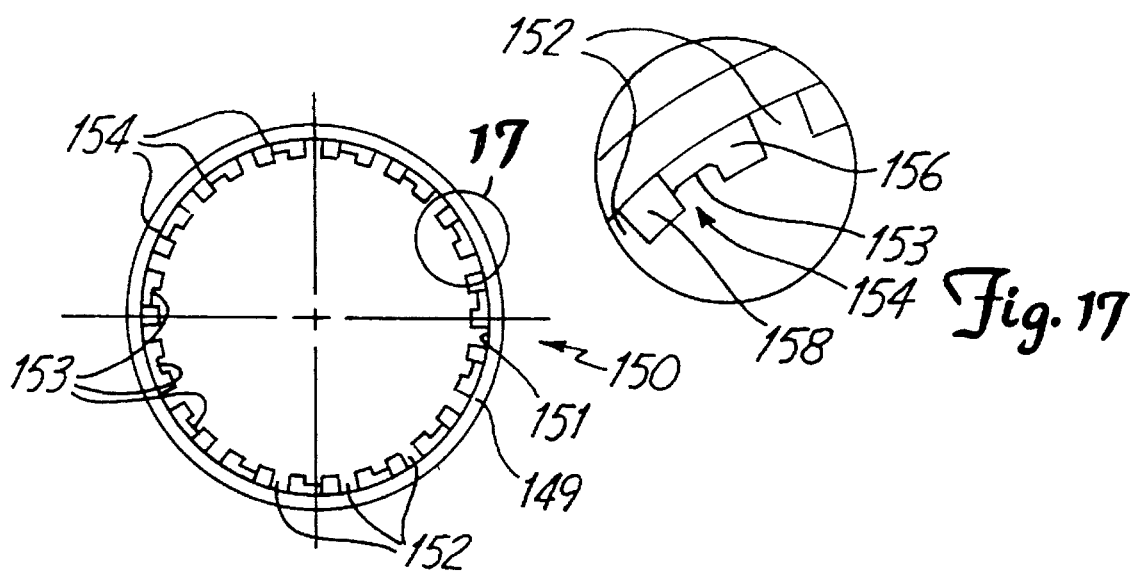
Fig. 16
Fig. 17

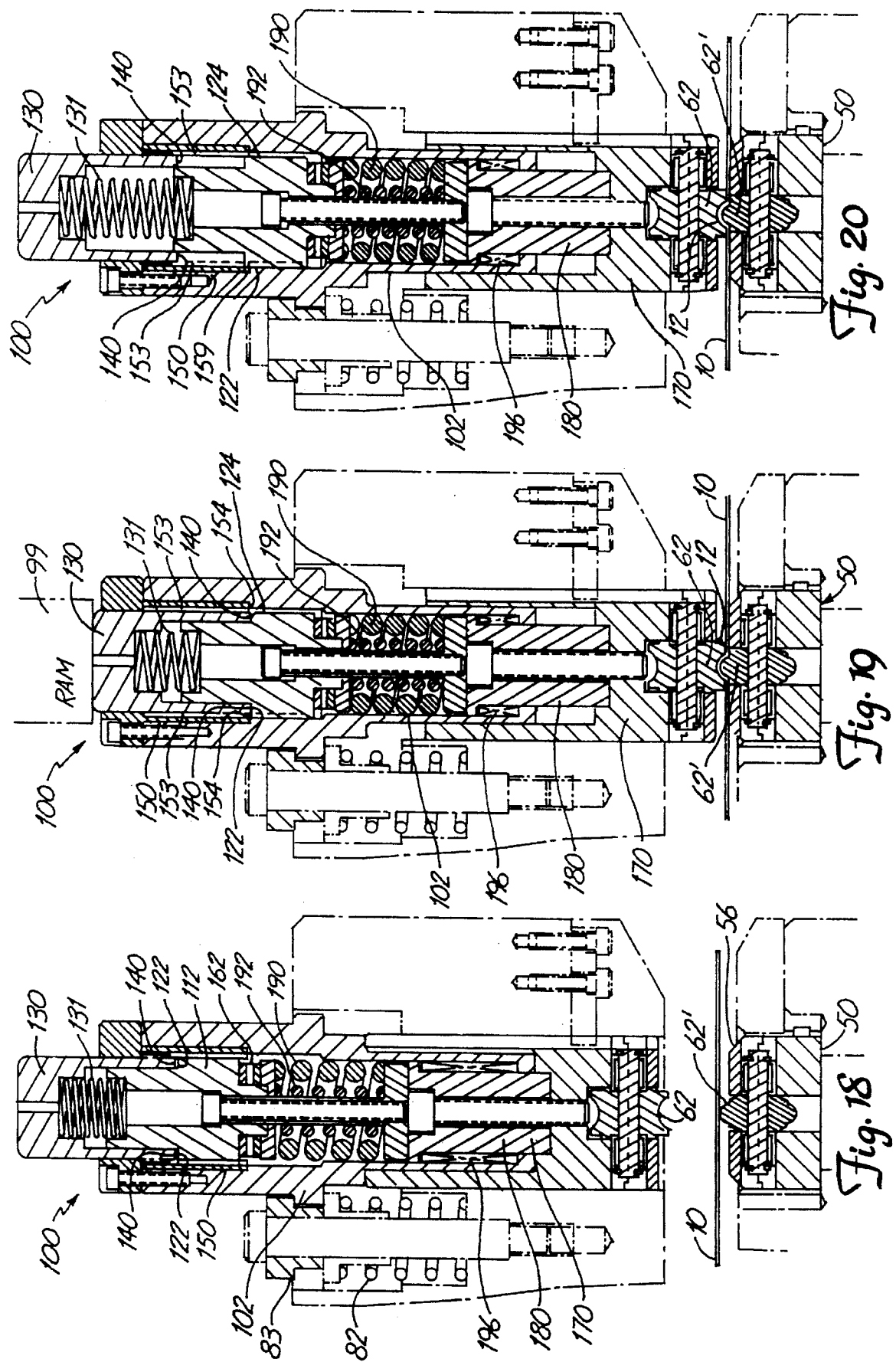

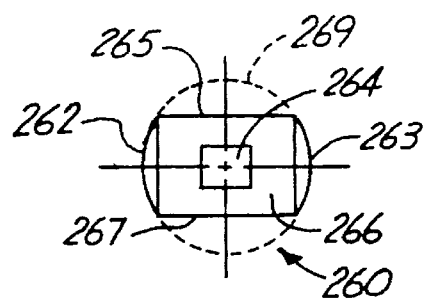
Fig. 23
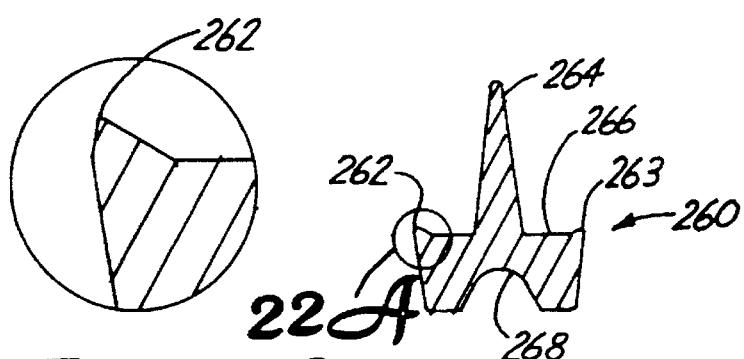
Fig. 22
Fig. 22A
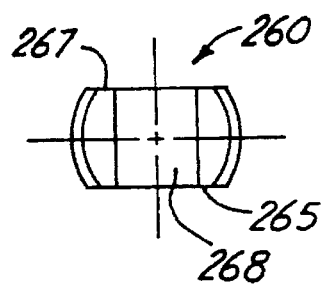
Fig. 24

WORKPIECE-DEFORMING TOOL AND DIE FOR USE IN A PUNCH PRESS

RELATED APPLICATIONS

This is a continuation in part of application Ser. No. 08/177,691, filed on Jan. 12, 1994, and entitled Workpiece-Deforming Tool and Die for use in a Punch Press.

TECHNICAL FIELD

This invention relates to tool assemblies useable with punch presses in general and particularly with multiple station turret punch machines.

BACKGROUND OF THE INVENTION

Multiple station turret punch machines provide a plurality of different punch stations for use in conjunction with a like number of opposing die cavities. Each station includes a punch unit and a corresponding die. Typically, several punch and die combinations are used in sequence to suitably shape a workpiece.

The punch machines generally have either a hydraulic ram or a mechanical ram for driving the punch downwardly against a workpiece. Punch machines having a hydraulic ram use a hydraulic fluid and drive cylinder system to reciprocate the ram upwardly and downwardly. In hydraulic ram punch presses, the ram may be sustained in any position along the stroke of the drive cylinder by appropriately controlling the amount and pressure of the hydraulic fluid in the drive cylinder. One such hydraulic ram punch press is the Amada Vipros 357. In punch presses having a mechanical ram, a cam-like head is mounted on a rotating shaft which is positioned substantially normal to the axial movement of the punch to reciprocate the ram. The cam-like head momentarily strikes the punch unit on its downward stroke, and then returns to its raised position as the shaft is rotated. One such mechanical punch press known in the art is the Amada Lyla Series 50-50-72.

Conventional punch units have a punch guide, a punch driver, and a punch tip fixedly attached to the punch driver. The punch driver and punch tip are positioned in the punch guide for reciprocal axial movement along the longitudinal axis of the punch guide, and the guide itself is positioned within a tool-receiving aperture in a turret for reciprocal axial movement therein, all in a manner known to the art. Punch tips may have a variety of shapes for punching holes, cutting, and making impressions in a workpiece.

Conventional dies mate with conventional punch units. A die is fixedly positioned underneath a mating punch and receives the punch tip as it punches through a workpiece. The punch tip may have a cutting face of any desired shape, and the mating die may have a correspondingly shaped orifice so that holes of the desired shape are formed in the workpiece. If a dimple is to be formed in the workpiece, the punch may have a generally spherical convex workpiece contacting face, and the die may have a correspondingly shaped concave surface.

In general, a turret punch press includes a horizontal workpiece support surface and a mechanism for moving a workpiece in a precise and predetermined manner on the support surface. The punch press includes a punch station where the punching operation occurs, generally in the plane of the support surface. The press also includes a turret that rotates about a vertical axis. Aligned, tool-receiving frames are carded by the turret on each side of the plane of the workpiece support surface. The upper frame usually holds a series of punches spaced circumferentially around the frame, and the lower frame holds a series of circumferentially spaced dies aligned beneath and mated to the respective punches. The punches are spring-biased upwardly and are mounted to move from their upper positions downwardly into lower, punching positions when struck by a punch press ram.

In a typical punching operation, a workpiece is clamped in a desired position on the support surface and the turret is rotated to bring a selected punch and die combination to the punch station. The punch ram is then cycled downwardly and upwardly, striking the punch on its downward stroke to drive the punch tip into a workpiece-deforming position in which the punch tip contacts the workpiece.

An elongated rib may be formed in a workpiece by making a series of dimples, moving the workpiece slightly between each dimple. Forming elongated deformations of this type using conventional punch tools is time consuming and produces excessive wear on the equipment. To create a deformation larger than the cross-section of the punch tip, the workpiece must be incrementally moved between punching operations. In fast punch presses, the ram can reciprocate several times per second. However, to create a smooth deformation in nibbling or rib-forming operations, a workpiece typically can only be moved about 1/32" after every stroke of the ram. Conventional punch tools thus may be able to form a rib at a rate of only about 1/8 inch per second. This rate of deformation prevents cost effective use of punch presses to machine curved deformations such as the raised ribs on metallic cylinder gaskets.

Additionally, when conventional punch units are so used, they tend to create small, unintentional but visible marks in elongated ribs or other impressions. The unintentional marks are roughly transverse to the longitudinal direction of the ribs so that they reduce the quality of the resulting product.

In light of the problems of conventional punch units, the present inventors developed a punch and die assembly with rollers for use in hydraulic punch presses. The device requires punch presses in which the ram can maintain continuous pressure against the punch tool while the punch is in the depressed position. Accordingly, the device is generally limited for use in hydraulic punch presses.

As previously described, however, many punch presses have mechanical rams that reciprocate upwardly almost immediately after the punch unit reaches the depressed position. Since mechanical rams cannot maintain the continuous pressure necessary to operate the roller punch and die assembly designed for hydraulic punch presses, a need exists to provide another roller punch and die assembly that is self-locking in the depressed position and self-releasing from the depressed position for use in mechanical punch presses.

SUMMARY OF THE INVENTION

The invention makes use of modified punch and die-like tooling that can be received in the tool holding frames of a turret punch press and which includes roller surfaces for deforming a workpiece. In the process of the invention, the punch does not immediately return to its upper position after being struck downward by the ram. Rather, the punch is maintained in its lower position in contact with the workpiece while the workpiece is concurrently moved in a predetermined path on the support surface. An elongated deformation is formed by the roller punch/die combination as they roll along the workpiece while the workpiece is moved.

Thus, in one embodiment, the invention provides a workpiece-deforming tool having an elongated body shaped to be received in a tool receiving aperture in a punch press for reciprocal and axial movement along the longitudinal axis of the aperture. A rotatable workpiece-deforming roller is carried by the body so that it contacts a workpiece when the body is struck by a ram. The body may include an upper end adapted to be struck by a ram and a spring seat positioned to engage a compressible spring biasing means carded by the punch press. The rotatable workpiece-deforming roller creates an elongated deformation as the workpiece is moved on the support surface while the roller contacts the workpiece in a workpiece-deforming position.

The body of the workpiece-forming tool may include a guide shaped to be received in a tool-receiving aperture and to move reciprocally along the longitudinal axis of the aperture; and a driver adapted to be struck by the ram. The driver may be received in the guide so that the driver and the guide are in telescoping relationship. In this embodiment, the guide carries the rotatable workpiece-deforming roller. A compression spring may be positioned between the guide and the driver to transmit the downward force of the ram from the driver to the guide and roller, thereby causing the roller to come in contact with the workpiece.

A coacting rotatable workpiece-deforming roller may be carried in a die base and positioned in alignment with the roller carried by the body. The coacting roller is configured with respect to the roller carried by the body so that the rollers coact on opposite sides of a workpiece to deform the workpiece in a predetermined manner. An elongated deformation is produced by moving the roller carried by the body into a workpiece-deforming position and then translating the workpiece between the rollers.

The rollers rotate about axes that desirably are parallel to each other. The axes about which the rollers rotate are positionable at any angle relative to the axial movement of the body ranging from 90° to parallel. The rollers may have workpiece-contacting surfaces of virtually any shape. For example, a roller carried by the body may have a contacting surface with a concave U-shape, and a coacting roller may have a workpiece contacting surface with a mating upwardly convex U-shape. This combination of rollers produces an elongated deformation or rib having a U-shaped cross section. The present invention is capable of making elongated deformations of virtually any cross-sectional shape, as well as making elongated cuts in a workpiece.

In another embodiment, the invention includes a turret punch press assembly having a rotating turret tool holding frame. The turret has at least one, and preferably a plurality of tool receiving apertures for receiving workpiece-deforming tools. The punch press includes a workpiece support surface that defines a plane in which the workpiece is translated, and means for translating the workpiece in this plane. The punch press also includes a ram for urging and maintaining a workpiece-deforming tool into a workpiece-deforming depressed position, and a compressible spring biasing means housed in the tool frame for biasing tools upward after the ram is released.

In a turret punch press assembly of the present invention, a workpiece-deforming tool carrying a rotatable workpiece-deforming roller is placed in a first tool receiving aperture of the tool holding frame on one side of the workpiece supporting surface. A die base carrying a coacting rotatable workpiece-deforming roller is placed in a second tool receiving aperture on the other side of the workpiece support surface. The first tool receiving aperture is generally positioned above the workpiece support surface. The coacting roller in the second aperture is positioned in alignment with the roller carried by the workpiece-deforming tool, and the rollers remain aligned with each other as the turret is rotated about a vertical axis.

A turret punch press assembly of the present invention quickly creates high quality elongated deformations by translating a workpiece between the roller carried by the body and the coacting roller carried by the die base. A ram depresses the body and its roller into the workpiece-deforming position to engage the roller carried by the body on one side of the workpiece and the coating roller carried by the die base on the opposite side of the workpiece. While the rollers are maintained in the workpiece-deforming position, as by continued downward force delivered by the ram, the workpiece is translated between the rollers.

In still another embodiment, the invention provides a self-locking workpiece-derforming tool for use in mechanical punch presses in which the ram cannot maintain continuous pressure against the tool in the depressed position. This embodiment of the invention includes an elongated punch guide having an interior surface defining a chamber extending therethrough. A punch body having upper and lower segments is at least partially received within the chamber for reciprocal axial movement with respect to the guide between the raised and depressed positions. The lower segment of the body carries a rotatable workpiece-deforming roller at its lower end. The punch assembly includes a positioning means for sustaining the body and the rotatable workpiece-deforming roller in the depressed position without requiting the ram to exert a continuous downward pressure on the tool. The positioning means locks the body and the rotatable workpiece-deforming roller in the depressed position upon a momentary strike by the ram, and releases the body and rotatable workpiece-deforming roller upon a subsequent momentary strike by the ram. A biasing means for urging the body and the rotatable workpiece-deforming roller into the raised position after the positioning means is released is operatively positioned between the punch guide and the punch body.

The rotatable workpiece-deforming roller creates an elongated deformation as the workpiece is moved along the support surface while the roller contacts the workpiece in a workpiece-deforming position in the same manner described above. In the self-locking embodiment of the invention, however, the rotatable workpiece-deforming roller maintains contact with the workpiece in the depressed position without requiring the ram to exert a continuous downward pressure against the tool.

An objective of the present invention is to improve the speed of punch press manufacturing operations by increasing the rate at which elongated deformations can be made in a workpiece. The present invention achieves a significantly higher deformation rate than conventional punches because the rollers allow continuous translation of a workpiece while the rollers are in the workpiece-deforming position. Consequently, a workpiece may be moved between the rollers without having to disengage the tool.

Another objective of the present invention is to create smooth elongated deformations by maintaining continuous contact between the workpiece-deforming tool and workpiece while concurrently drawing the workpiece through the rollers.

Another objective of the invention is to improve the working life of punch presses and workpiece-deforming tools. The present invention significantly reduces the number of cycles required to create an elongated deformation because a deformation can be created with only one cycle of the punch press.

Yet another objective of the invention is to provide a punch and die assembly with rollers for use in mechanical punch presses in which the ram cannot maintain continuous pressure against the tool in a workpiece-deforming depressed position. The present invention provides a self-locking punch that can sustain itself in the workpiece deforming position upon being momentarily struck by the ram, and then release itself upon a subsequent momentary strike by the ram.

These and other features of the invention will become more apparent upon reference to the following description of the preferred embodiment of the invention, and in particular, upon referring to the drawings.

BRIEF DESCRIPTION OF THE DRAWINGS

FIG. 5 is a schematic plan of a turret punch press assembly showing rotational movement of a turret and transnational movement of a workpiece;

FIG. 6 is a cross-sectional view of a roller set of the invention for cutting a workpiece to create an elongated cut;

FIG. 8 is a cross-sectional view of a roller set of the invention for deforming an edge of a workpiece.

FIG. 14 is a cross-sectional view of a sleeve of one embodiment of a positioning means for use with the self-locking workpiece-deforming tool of FIG. 9;

FIG. 15 is a blow-up view of the lower portion of the sleeve of FIG. 14;

FIG. 16 is a bottom view of the sleeve of FIG. 14;

FIG. 17 is a blow-up view of a portion of the sleeve of FIG. 16;

FIG. 18 is a cross-sectional view of the self-locking workpiece-deforming tool of FIG. 9 in a raised position;

FIG. 19 is a cross-sectional view of the self-locking workpiece-deforming tool of FIG. 18 in a depressed position being engaged by a ram;

FIG. 20 is a cross-sectional view of the self-locking workpiece-deforming tool of FIG. 18 in a self-locking depressed position;

FIG. 22 is a cross-sectional view of a pivoting element of a positioning means for use in the self-locking workpiece-deforming tool of FIG. 21;

FIG. 22A is an expanded view of the segment designated 22A in FIG. 22;

FIG. 23 is a top view of the pivoting element of FIG. 22;

FIG. 24 is a bottom view of the pivoting element of FIG. 22;

DETAILED DESCRIPTION OF THE PREFERRED EMBODIMENT

Figure 1:
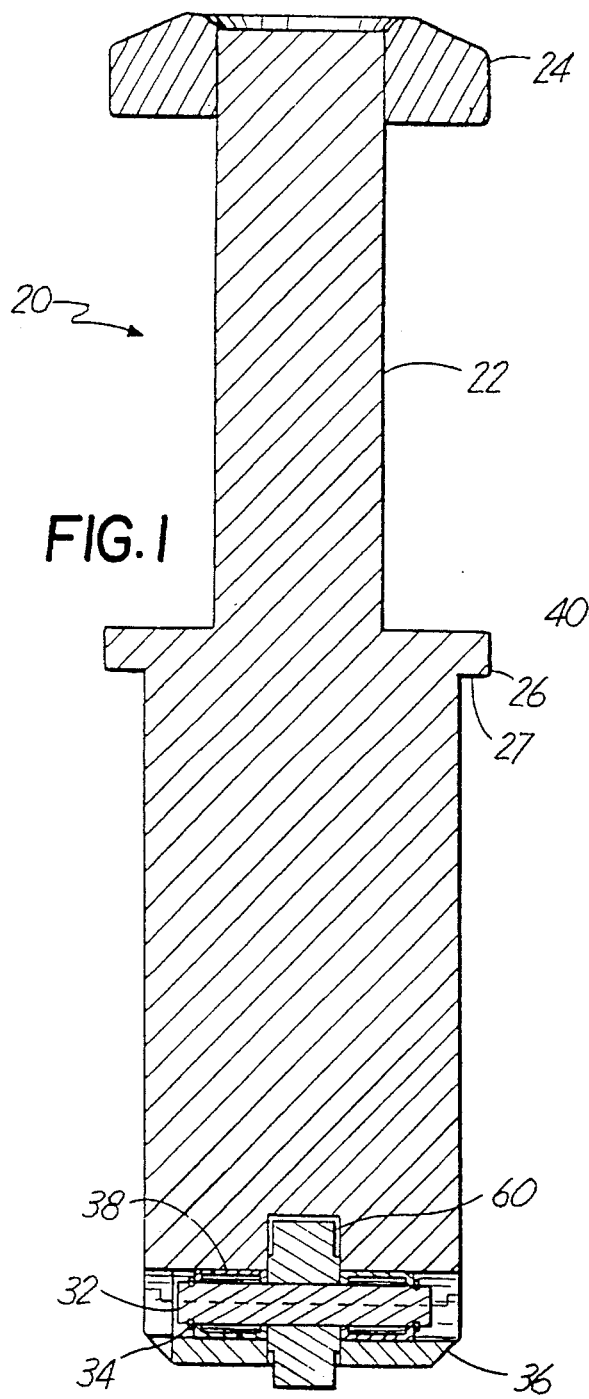
FIG. 1 is a cross-sectional view of a workpiece-deforming tool of the invention.

A workpiece-deforming tool 20 embodying the invention is illustrated in FIG. 1. The tool 20 has an elongated and generally vertical body 22 that is receivable in a tool receiving aperture in a punch press for movement axially between a raised position and a workpiece-deforming depressed position. The body includes a spring seat 26 for engaging a compression spring (not shown) carried in the tool receiving aperture that acts against surface 27 to urge the body into its raised position. The body 22 includes a head 24 at its upper end that is adapted to be struck by the ram of a punch press. The body 22 also carries a rotatable workpiece-deforming roller 60 at its lower end.

As shown in FIG. 1, the roller 60 rotates around shaft 32 which is mounted in roller or pin bearings at the lower end of the body. The shaft 32 may be positioned normal to the axial motion of the body 22 as shown in FIG. 1, or any other angle relative to the axial motion of the body up to being parallel as shown in FIG. 8. The shaft 32 rotates within the bearings 38 which are held in place by retaining rings 34. The roller 60 is secured to the body 22 by a cap 36 and a cap screw (not shown).

Figure 2:
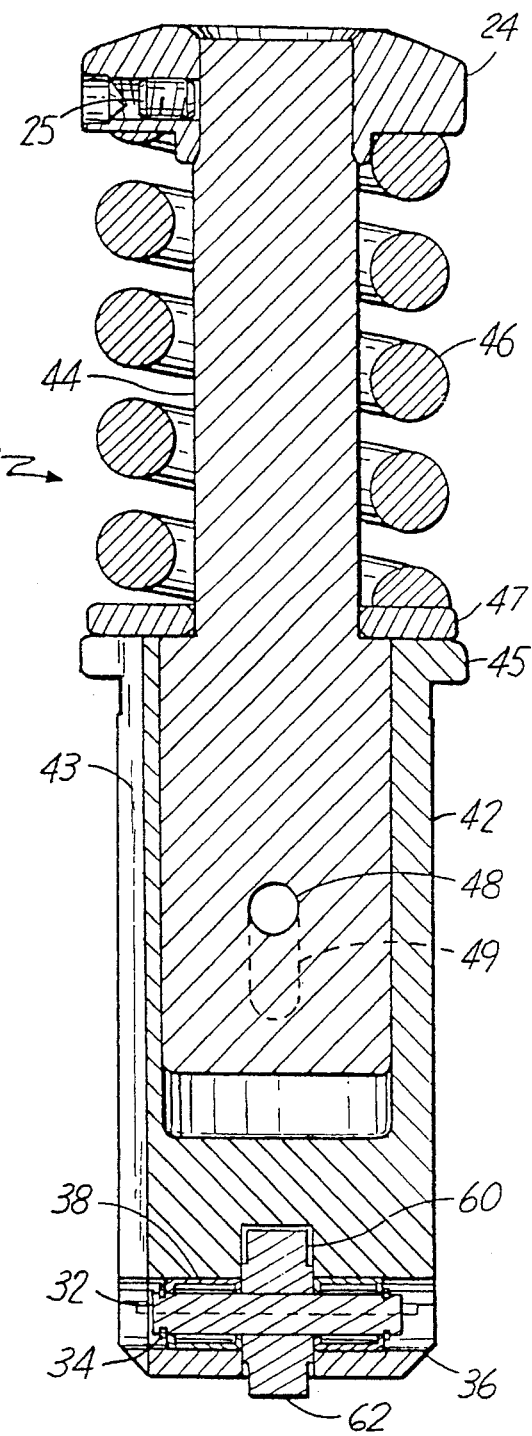
FIG. 2 is a cross-sectional view of another a workpiece-deforming tool of the invention.

FIG. 2 shows a modified workpiece-deforming tool 40 having an elongated and generally vertical guide 42 that is receivable in a tool receiving aperture in a punch press. A punch driver 44 is telescopically received within the guide 42. The guide 42 has a spring seat 45 for engaging a compression spring means carried by the tool receiving aperture. A key way 43 runs along the longitudinal axis of the guide 42 for receiving a key (not shown) carried by the tool receiving aperture. The guide 42 also includes a slot 49 for receiving a dowel pin 48 that is fixedly attached to the punch driver 44.

A head 24 is fixedly attached to the driver 44 by threads and a radial set screw 25. A compression spring 46 is captured between the head 24 and a support ring 47 borne by the spring seat 45. The spring 46 transmits the downward force of the ram from the driver 44 to the guide 42, thereby moving the guide 42 downward. A rotatable workpiece-deforming roller 60 is carried by the guide 42 in the same manner shown in FIG. 1.

As the ram of a punch press depresses the head 24, it urges the driver 44, the guide 42 and the roller 60 into the workpiece-deforming position. The dowel pin 48 may travel within the slot 49 as the spring 46 compresses the driver 44. After the ram releases the driver 44, the spring 46 urges the driver upward, and the compressible spring biasing means carried by the tool receiving aperture urges the guide 42 upward disengaging the roller 60 from the workpiece.

Figure 3:
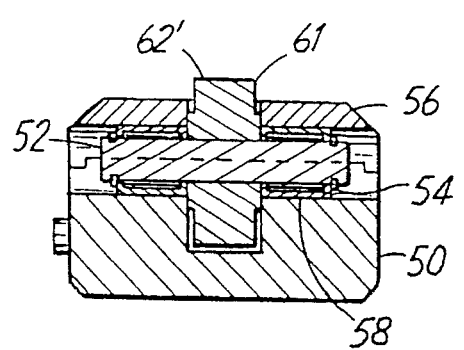
FIG. 3 is a cross-sectional view of a die base and coacting roller.

FIG. 3 shows an alternative embodiment of the invention employing coacting rollers. The die base 50 carries a coacting rotatable workpiece-deforming roller 61 in alignment with the roller 60 carried by the guide 42 shown in FIG. 2. Coacting roller 61 is carried by the die base 50 in the same manner that the roller 60 is carried by the guide 42 in FIG. 2. The coacting roller 61 rotates about a shaft 52 that is supported by one or more bearings, with two bearings 58 being shown in FIG. 3. A cap 56 is attached to the die base 50 by cap screws (not shown).

The coacting roller 61 is configured with respect to the roller 60 so that the rollers continuously and concurrently deform a workpiece as it is translated between them. It will be appreciated that the rollers may have a variety of workpiece contacting surfaces 62 and 62' including, but not limited to, surfaces having an S-shape, U-shape, V-shape, W-shape, as well as continuous blades, shears, and perforating points. In some cases, the workpiece-contacting surface 62 of roller 60 may have a cross-sectional shape that generally mates with the cross-sectional shape of the work-contacting surface 62' of roller 61.

Figures 4A, 4B:
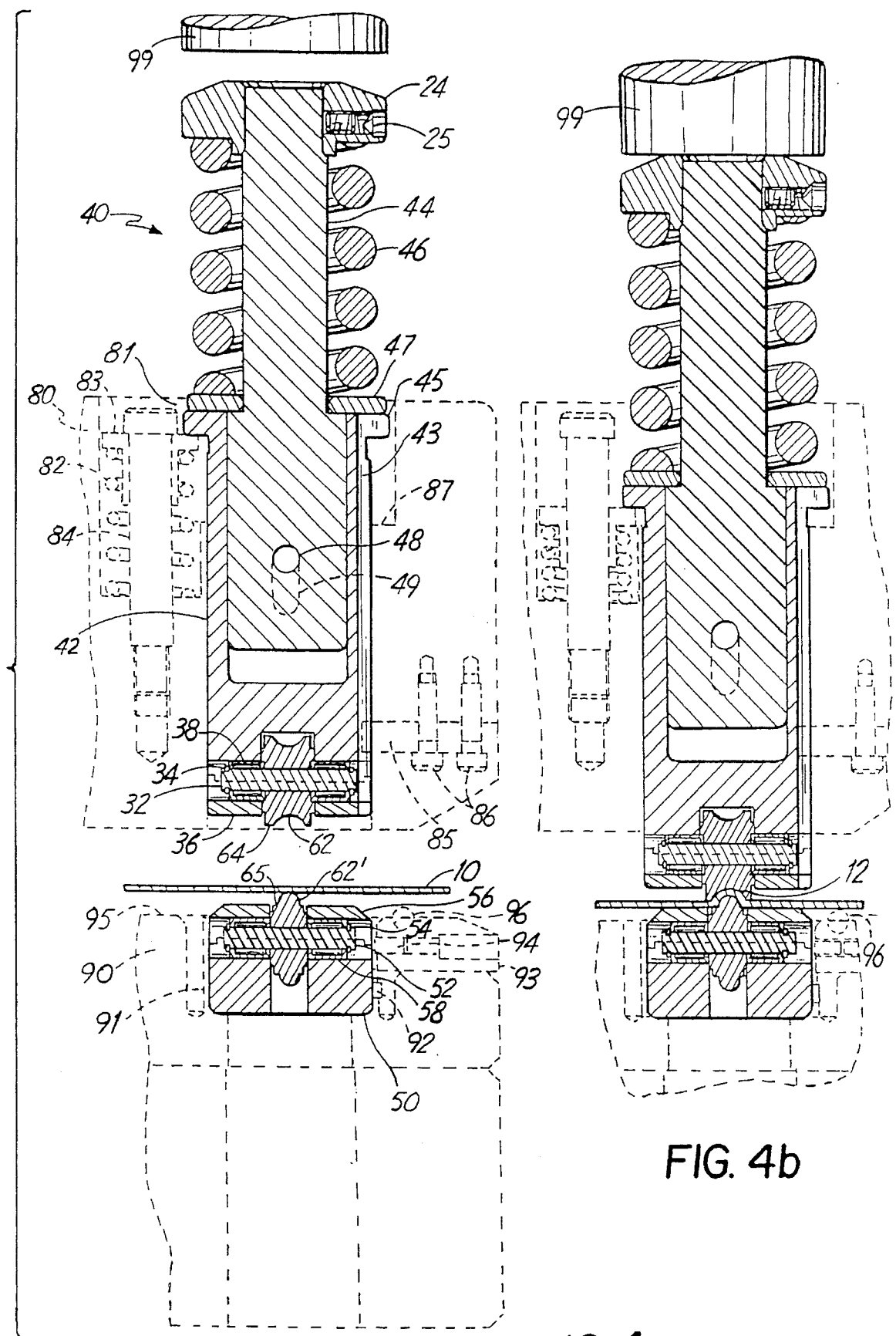
FIG. 4(a) is cross-sectional view of a turret punch press assembly in accordance with an embodiment of the invention with the rollers in a separated position.
FIG. 4(b) is cross-sectional view of a turret punch press assembly in accordance with an embodiment of the invention with the rollers in a workpiece-deforming position.

FIGS. 4a and 4b depict a preferred embodiment of the invention employing the workpiece-deforming tool 40 and a turret punch press assembly. The turret punch press assembly includes a platform 95 which carries a number of ball bearings 96 so that a portion of the ball bearings 96 is positioned above the platform 95. The tops of the ball bearings 96 define a plane that is approximately 1/32" below the workpiece as it is deformed. Turret punch presses also include an upper rotating tool holding frame 80 positioned above the platform 95, and a lower tool holding frame 90 positioned below the platform 95. The upper turret 80 has at least one, and preferably a plurality of first tool receiving apertures 81. The lower turret 90, includes at least one, and preferably a plurality of second tool receiving apertures 91. The upper turret 80 and lower turret 90 may be rotatable about a vertical axis so that each first tool receiving aperture 81 remains aligned with a corresponding second tool receiving aperture 91.

The deforming tool 40 is positioned in the turret frame 80 in the first tool receiving aperture 81. The guide 42 of the workpiece-deforming tool 40 moves axially within the first tool receiving aperture 81, reciprocating between an upper or raised position and a lower or workpiece-deforming position. The guide 42 is urged upward by a compressible spring biasing means carried by the turret frame 80, and exemplified in FIGS. 4a and 4b as including a series of upright pins 84 spaced circumferentially about the aperture 81, each pin having a surrounding compression spring 82 supporting an annular lifting plate 83. The spring seat 45 of the punch guide is supported on the annular lifting plate 83, enabling the guide to move downwardly against the pressure of the springs 82. The upper surface of the annular lifting plate 83 engages the head of the pin 81 which prevents the punch 40 from moving upwardly beyond the position shown in FIG. 4a. The guide 42 maintains its position relative to the turret 80 by means of a key 85 that extends from the turret into the key way 43 formed in the guide. Two cap screws 86 fixedly attach the key 85 to the turret 80.

A rotatable workpiece-deforming roller 64 for making a raised elongated deformation having a U-shaped cross section is carried by the guide 42 in the manner described in FIG. 2. A corresponding coacting rotatable workpiece-deforming roller 65 for making a raised deformation having the same U-shard cross section is carried by the die base 50 which is disposed in a second tool receiving aperture 91. The coacting roller 65 is positioned slightly above the platform 95 and bearings 96. A workpiece 10 may be introduced between the rotatable workpiece-deforming roller 64 carried by the guide 42 and the coacting roller 65 carried by the die base 50 when the ram 99 is not depressing the driver 44.

FIG. 4b depicts the same embodiment of the invention after the ram 99 has engaged the driver 44 and is preventing the driver from retreating upwardly. The downward pressure of the ram 99 is transmitted from the driver 44 through the spring 46 to the guide 42, thereby compressing the spring 46 slightly and permitting the roller 64 to position itself vertically against the workpiece under pressure of the spring. The spring 46 thus causes a substantially constant pressure to be maintained by the roller 64 against the workpiece 10 by allowing for some variation in workpiece thickness and in vertical ram positioning. Vertical positioning of the roller 64 may be adjusted by controlling the length of stroke of the ram and the vertical length of the roller tool assembly.

As the ram 99 holds the roller 64 in the workpiece deforming depressed position, the workpiece 10 is translated between the rollers 64 and 65 to create an elongated deformation or rib having a U-shaped cross section 12. It will be appreciated that the rate of rib formation is not limited by requiring continuous reciprocation of the tool 40 to make a series of closely spaced dimples. Instead, deformation can occur at rates as high as the linear speed of translation of the workpiece over the platform 95 on the bearings 96.

FIG. 5 schematically shows a turret punch press assembly capable of providing a number of different punch stations and moving a workpiece in the plane defined by a workpiece support surface. The turret 80 has first tool receiving apertures 81 and 81', the latter being shown at the punching station. The turret 80 rotates to carry different tools to the punching station. The workpiece 10 is translated in the plane defined by the workpiece support surface by translating means such as the arm mechanism 100.

The mechanism 100 generally includes one, two or more arms 101 that clamp onto or otherwise fixedly attach to the workpiece 10, and a computer controlled positioning unit 102. The positioning unit, which can be of the type commonly used with punch presses, moves the workpiece so that the part of the workpiece that is to be deformed is positioned at the punching station. The positioning unit 102 divides the workpiece support surface into a grid of coordinates defined by orthogonal axes X and Y in the plane of the support surface. The positioning unit 102 moves the workpiece by moving the arms 101 along the orthogonal axes X and Y through a series of predetermined coordinates. For example, the positioning unit 102 creates a curved deformation in a workpiece by moving the arms 101 through X and Y coordinates in small increments that define an arc.

Referring to FIGS. 4a, 4b, and 5, a tool indexing unit of known design may be employed to rotate a workpiece-deforming tool 40 tool and its corresponding die base 50 as shown by directional arrows 89 in FIG. 5. The tool indexing unit may be controlled by the same computer that controls the positioning unit 102 allowing the deforming tool 40 and its corresponding die base 50 to be incrementally rotated to position the longitudinal axes of the roller mounting shafts 32 and 52 substantially normal to a tangent to the path of the deformation in the workpiece 10. By positioning the axes of shafts 32 and 52 substantially normal to a tangent of the path of the deformation in the workpiece 10, the rollers remain free to roll in the direction of the tangent.

Figure 7:
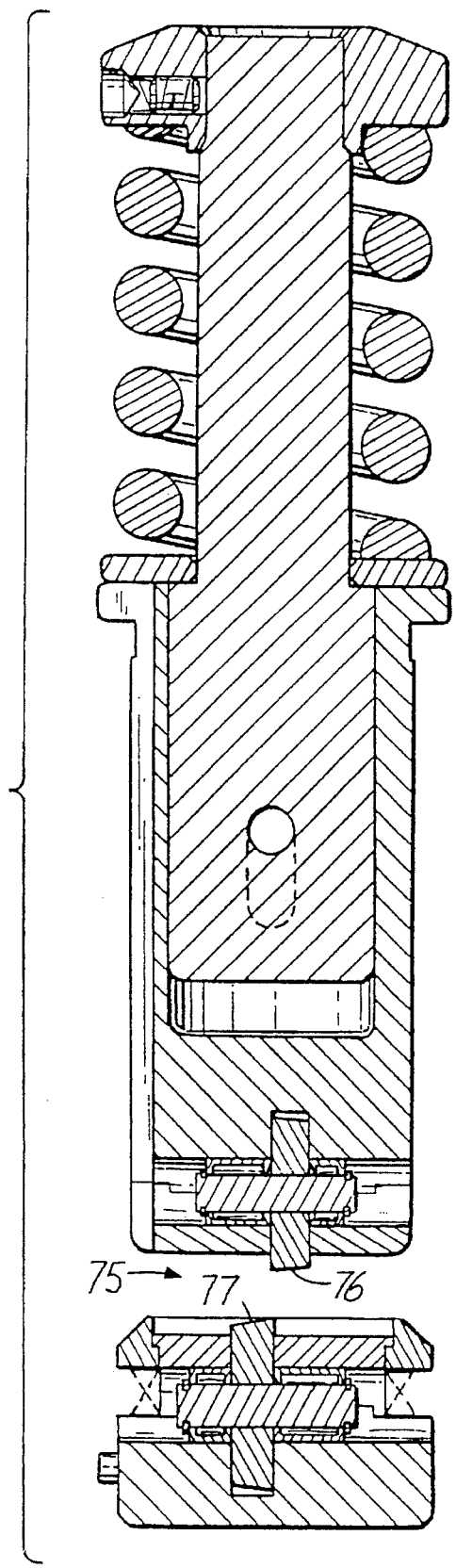
FIG. 7 is a cross-sectional view of a roller set of the invention for shear-cutting of a workpiece.

FIGS. 6–8 show a number of embodiments of the present invention having different rotatable workpiece-deforming rollers. FIG. 6 shows a roller set 67 for piercing a workpiece to make an elongated cut. In FIG. 6, a continuous blade 68 bears against a flat coacting roller 69 when the body of the workpiece-deforming tool is urged into the workpiece-deforming position. An elongated cut is formed by translating the workpiece between the rollers. This roller set is particularly useful to cut sheet metal, or other less substantial materials such as plastic sheets or cardboard. If desired, the roller may be a punch wheel having circumferentially spaced, radially extending punch tips configured to make a series of perforation in a workpiece.

FIG. 7 depicts a roller set 75 for shearing a workpiece having two rollers 76 and 77 shaped like sharp-edged truncated cones that extend longitudinally between a first face and a second face. The first face of each roller has larger diameter than the second face. The first faces of rollers 76 and 77 are positioned so that they will be facing each other and normal to the workpiece support surface (not shown), with part of the first face of roller 76 almost contacting part of the first face of roller 77 when the rollers are in the workpiece-deforming position. As the rollers contact the workpiece, roller 76 creates a downwardly directed force and roller 77 creates an opposing upwardly directed force to shear the workpiece between the rollers. It will be appreciated that the roller set 75 works much like the blades of a scissor. Thus, two or more elongated cuts may be connected to create an elongated hole in a workpiece by using the workpiece deforming tool of the present invention.

FIG. 8 shows a roller set 71 for deforming an edge of a workpiece. A rotatable workpiece-deforming roller 72 and a coacting roller 73 rotate about axes that are parallel to the axial movement of the guide 42. The rollers 72 and 73 have mating S-shapes so that they create a deformation along an edge of the workpiece having an S-shaped cross section.

Figure 9:
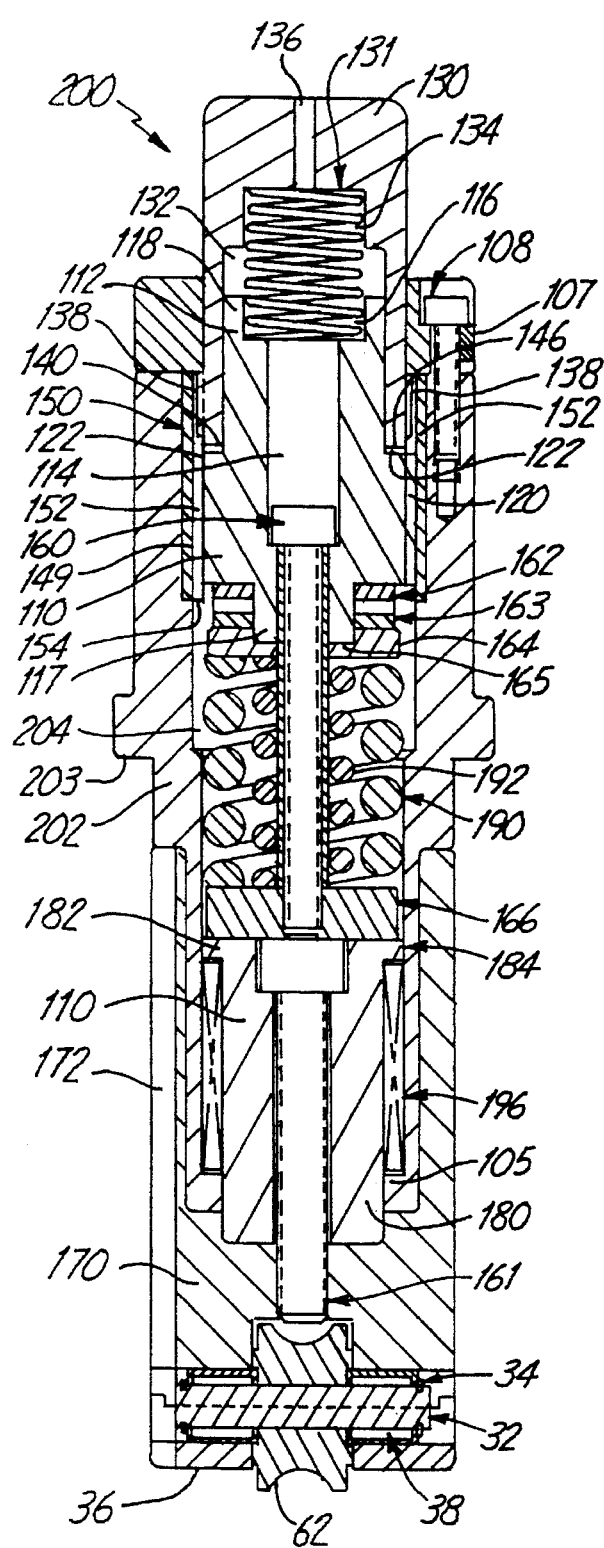
FIG. 9 is a cross-sectional view of one embodiment of a self-locking workpiece-deforming tool of the invention.

FIG. 9 shows a self-locking workpiece-deforming tool 200 for use in a punch press having ram that cannot maintain continuous pressure against the punch unit in a depressed position. The tool 200 has an elongated and generally vertical punch guide 202 that is receivable in a tool-receiving aperture in a punch press. The punch guide 202 has an interior wall defining a chamber 204 and an exterior shoulder 203 for engaging a compression spring mechanism (not shown) of the punch press. A head driver 130 is positioned at least partially within the cavity 204 of the guide 202, and has an internal cavity 132, an opening 136 and a recess 134. The head driver 130 extends upwardly out of the cavity 204 and is secured to the guide 202 by a head plate 107 and a cap screw 108. In one embodiment, the head driver 130 also includes radially extending detents 138 positioned at selected increments around the perimeter of its lower portion.

The punch tool 200 further includes a punch body 110 that is at least partially received within the chamber 204 for reciprocal and axial movement with respect to the guide 202 between a raised position and a workpiece-deforming depressed position. In one preferred embodiment, the punch body 110 includes an upper segment 112 and a lower segment 180. The upper segment 112 includes a top portion 118 and a lower portion 117. An opening 114 extends through the upper segment 112 from the bottom of a recess 116 to the bottom portion 117. A number of flanges 120 extend radially outwardly from the upper segment 112. A head spring 131 is positioned between the upper segment 112 and the head driver 130 in a cavity 132 defined by the inner wall of the head driver so that it rests in recesses 134 and 116.

The upper and lower segments 112, 180 operate together through a system of bolts, springs and plates. A bolt 160 is positioned so that its head is positioned within the opening 114 of the upper segment 112 for axial and reciprocal movement therein. The stem of the bolt extends downwardly through the bottom portion 117 of the upper segment 112 and is threadedly connected to a holddown plate 166. A thrust washer 163 and a thrust bearing 162 are positioned against the lower surface of the flanges 120 and around the bottom portion 117 of the upper segment. Another washer 164 having a recess 165 is positioned under the bottom portion 117 of the upper segment 112 and against the thrust washer 163. A first spring 190 and an interior spring 192 are positioned between the washer 164 and the holddown plate 166 for biasing the holddown plate 166 downwardly away from the upper segment 112.

The lower segment 180 has an upper portion 184 with an annular lip 182, and the lower segment 180 is positioned so that its top surface abuts the holddown plate 166. A second spring 196 is positioned between the lip 182 and an inwardly depending shoulder 105 of the guide 202. The second spring 196 is preferably a wave spring positioned around the exterior of the lower segment 180.

In one preferred embodiment the lower segment 180 carries a rotatable workpiece-deforming roller 62 at its lower end. The roller 62 rotates around a shaft 32 which is mounted in roller or pin bearings 38 at the end of the lower segment 180. The shaft 32 may be positioned normal to the axial motion of the body 110, or any other angle relative to the axial motion of the body up to being parallel as shown in FIG. 8. The shaft 32 rotates within the bearings 38 which are held in place by retaining rings 34.

In the embodiment shown in FIG. 9, the roller 62 is carried by a holder 170 that is connected to the lower segment 180 by a bolt 161. The holder 170 may include a key way 172 for receiving a key (not shown) carried by the punch press for radially indexing the holder 170, rotatable workpiece-deforming roller 62 and body 110.

A positioning means 150 including the upper segment 112, head driver 130 and a locking sleeve 149 is positioned at the upper end of the guide 202. The positioning means 150 releasably sustains the body 110 and workpiece-deforming roller 62 in a depressed position without requiring the ram to exert a continuous pressure against the head driver 130.

Figure 10:
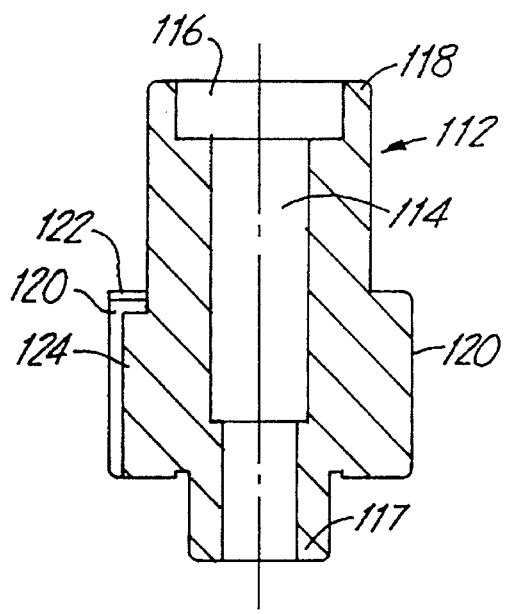
FIG. 10 is a cross-sectional view of an upper segment of one embodiment of a positioning means of the invention for use in the self-locking workpiece-deforming tool of FIG. 9.
Figure 11:
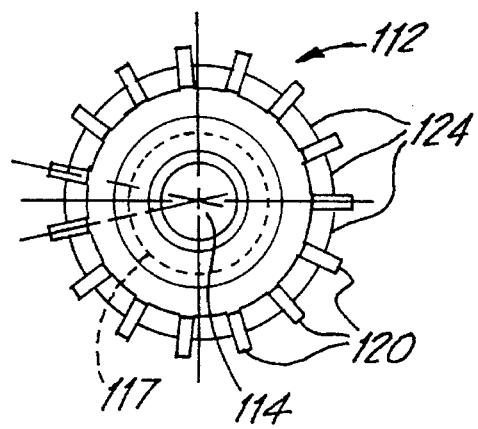
FIG. 11 is a top view of the upper segment of FIG. 10.

The operation of the positioning means 150 of the embodiment shown in FIG. 9 is better understood by referring to FIGS. 10–17, which show one preferred embodiment of its components. FIGS. 10 and 11 more particularly show one preferred embodiment of the upper segment 112 of the invention. The flanges 120 extend upwardly and radially outwardly from the shoulder 124, and each flange 120 has a slanted face 122. The number and spacing of the flanges 120 is not critical to the invention and may be varied according to the particular application of the punch. The number, size and spacing of the flanges 120 is determined by the amount of force being loaded on the flanges and the material from which the upper segment is made.

Figure 12:
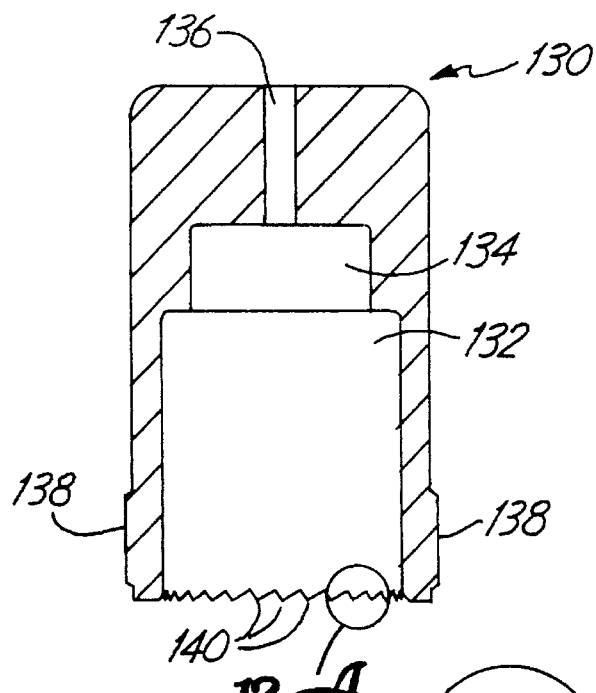
FIG. 12 is a cross-sectional view of a head driver of one embodiment of a positioning means for use in the self-locking workpiece-deforming tool of FIG. 9.
Figure 12A:
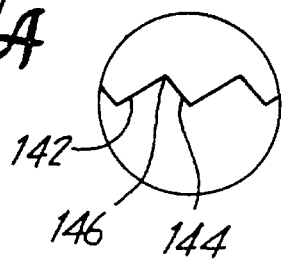
FIG. 12A is an expanded view of the segment designated 12A in FIG. 12.
Figure 13:
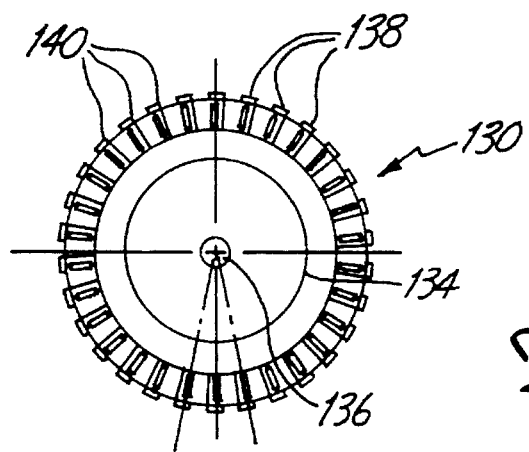
FIG. 13 is a bottom view of the head driver of FIG. 12.

FIGS. 12 and 13 depict the head driver 130 of one preferred embodiment of the invention. The head driver 130 includes a number of radially extending detents 138 positioned around its exterior wall, and a number of teeth 140 positioned along its bottom surface. The head driver includes a cavity 132 extending from the bottom surface to an intermediate section, and a recess 134 extending from the top of the cavity 132 towards the top surface of the head driver 130. An opening 136 extends from the top surface of the head driver 130 to the top of the recess 134 for permitting access into the cavity 132.

Each of the teeth 140 of the head driver 130 includes an inclined surface 142 for engaging a slanted face 122 of a flange 120, and an opposing inclined surface 144 extends downwardly from the inclined surface 142 to create a notch 146. The inclined surfaces 142 of the teeth are positioned at substantially the same angle as the slanted faces 122. In operation, each slanted face 122 of the flanges 120 engages a corresponding inclined surface 142 so that the apexes of the flanges 120 do not engage the notches 146 when the tool 200 is in the raised position. After the ram 99 moves the head driver 130 and upper segment 112 beyond the sleeve 149, the flanges 120 slide along the inclined surfaces 142 until they engage the corresponding notches 146. The upper segment is thereby radially indexed as the slanted faces 122 slide along the inclined surfaces 142 under the upward force of the first and interior springs 190, 192, until the apexes of the slanted faces 122 engage their corresponding notches 146.

FIGS. 14–17 depict one preferred embodiment of the sleeve 149 for use with the upper segment 112 and head driver 130 depicted in FIGS. 10–13. The sleeve includes a plurality of channels 152 and a plurality of stops 154 alternatingly positioned around the interior surface 151 of the sleeve 149. As shown in FIGS. 15–17, each stop 154 includes a first sloped bottom surface 156, a track 153 and a second sloped bottom surface 158. The first and second sloped bottom surfaces 156, 158 are positioned at substantially the same angle as the inclined surfaces 142 and the slanted faces 122. Each first and second sloped bottom surface 156, 158 are separated by an indent 159 which is positioned under the corresponding track 153.

The positioning means 150 is assembled by positioning the sleeve 149 in the upper portion of the chamber 204 of the guide 202. The radial detents 138 of the head driver 130 are positioned in the tracks 153 of the sleeve 149, allowing the head driver to axially and reciprocally move with respect to the sleeve 149. The flanges 120 of the upper segment are initially positioned in the channels 152 of the sleeve 149 when the upper segment is in the raised position. The flanges 120 move downwardly within the channels 152 when the ram 99 strikes the head driver 130, until the slanted faces 122 and the teeth 140 are positioned below the lowest point of the first sloped bottom surfaces 156. At this point, the upper segment 112 radially indexes a predetermined amount as the upward force of the springs 190, 192, 196 causes the slanted faces 122 to slide along the inclined surfaces 142 until the flanges 120 nest in the notches 146. After the flanges 120 nest in the notches 146, the slanted faces 122 are aligned with at least a part of the first sloped bottom surfaces 156 of the sleeve 149.

As the ram 99 retreats upwardly to its raised position, the slanted faces 122 engage and slide along the first sloped bottom surfaces 156 of the sleeve 149 under the upward influence of the springs 190, 192, 196. The slanted faces 122 continue to slide along the first sloped bottom surfaces 156 until they reach the indents 159, at which point the upper segment 112 is locked to the sleeve 149 and prevented from being urged into the raised position. By locking the upper segment 112 to the sleeve, the workpiece-deforming roller 62 is sustained in the depressed position without requiting continuous pressure to be exerted by the ram 99 against the head driver 130.

The positioning means 150 also releases the upper segment 112 and allows it to travel to the raised position upon a subsequent momentary strike by the ram 99. After the flanges 120 rest in the indents 159, the slanted faces 122 do not align with the notches 146 of the head driver 130. The upper segment 112 is released from the stops 154 of the sleeve 149 as the head driver 130 is moved downwardly and its teeth 140 re-engage the slanted faces 122. Because the flanges 120 are not aligned with the notches 146 of the head driver 130 when they are positioned in the indents 159 of the sleeve 149, the teeth 140 initially engage the upper faces 122 so that the flanges 120 do not rest in the notches 146 of the head driver. The flanges 120 slide along the inclined faces 142 into the notches 146 as the slanted faces 122 are moved below the lowermost points of the second sloped bottom surfaces 158, thereby radially indexing the upper segment 112 so that the slanted faces 122 can engage the second sloped bottom surfaces 158. After the ram 99 moves upwardly, the slanted faces 122 engage and slide against the second sloped bottom surfaces 158 under the influence of the springs 190, 192, 196 until the flanges 120 are positioned back into the channels 152. After the flanges 120 are positioned in the channels 152, the springs 190, 192, 196 move the upper segment 112 into the raised position. Upon the next momentary strike by the ram 99 the positioning means 150 may then engage and lock the upper segment 112, lower segment 180, punch holder 170 and the workpiece-deforming roller 62 into the depressed position.

FIGS. 18–20 depict the general operation of one preferred embodiment of the tool 200. FIG. 18 shows the tool 200 in a raised position. The rotatable workpiece-deforming roller 62 is carried by the punch holder 170 in the manner described in FIG. 9, and the corresponding coacting rotatable workpiece-deforming roller 62' is carded by a die base 50. A workpiece 10 is introduced between the rotatable workpiece-deforming roller 62 and the coacting roller 62' when the ram 99 is not depressing the head driver 130 and the positioning means 150 is disengaged. The upper segment 112 is urged upwardly with respect to the lower segment by the first compression spring 190, and in a preferred embodiment, the interior compression spring 192 is placed concentrically inside the first spring 190. The head driver 130 is urged upwardly with respect to the upper segment 112 by the head spring 131, and the lower segment 180 and punch holder 170 are urged upwardly with respect to the guide 202 by the second spring 196.

FIG. 19 depicts the same embodiment of the invention after the ram 99 has engaged the head driver 130 and moved the head driver 130, upper segment 112, lower segment 180, punch holder 170 and rotatable workpiece-deforming roller 62 into the workpiece-deforming depressed position. The downward pressure of the ram 99 is transmitted through the teeth 140 of the head driver 130 to the flanges 120 of the upper segment 112. The downward pressure of the ram is further transferred from the upper segment 112 through the springs 190, 192 to the lower segment 180 and roller 62. The first spring 190 and intermediate spring 192 cause a substantially constant pressure to be maintained by the roller 62 against the workpiece 10, which allows for some variation in thickness of the workpiece and vertical positioning of the punch holder 170.

FIG. 20 depicts the positioning means 150 locking the roller 62 in the workpiece-deforming depressed position, in which the workpiece 10 is translated between the rollers 62 and 62' to create an elongated deformation having a U-shaped cross-section 12. The flanges 120 engage the indents 159 of the sleeve 149 to prevent the upper segment 112 from being urged upwardly under the pressure of the first spring 190 and interior spring 192. By sustaining the upper segment 112 in the indents 159, the roller 62 maintains continuous contact with the workpiece 10 without requiring the ram 99 to continuously exert pressure against the head driver 130 during the entire workpiece-deforming operation. After the ram 99 disengages the head driver 130, the head driver is urged upwardly under the force of the head spring 131.

Upon a subsequent momentary strike by the ram 99, the flanges 120 disengage the indents 159 and become aligned with the channels 152. The upper segment 112, lower segment 180, punch holder 170 and workpiece-deforming roller 62 are then urged upwardly into the raised position under the force of the springs 190, 192 and 196.

Figure 21:
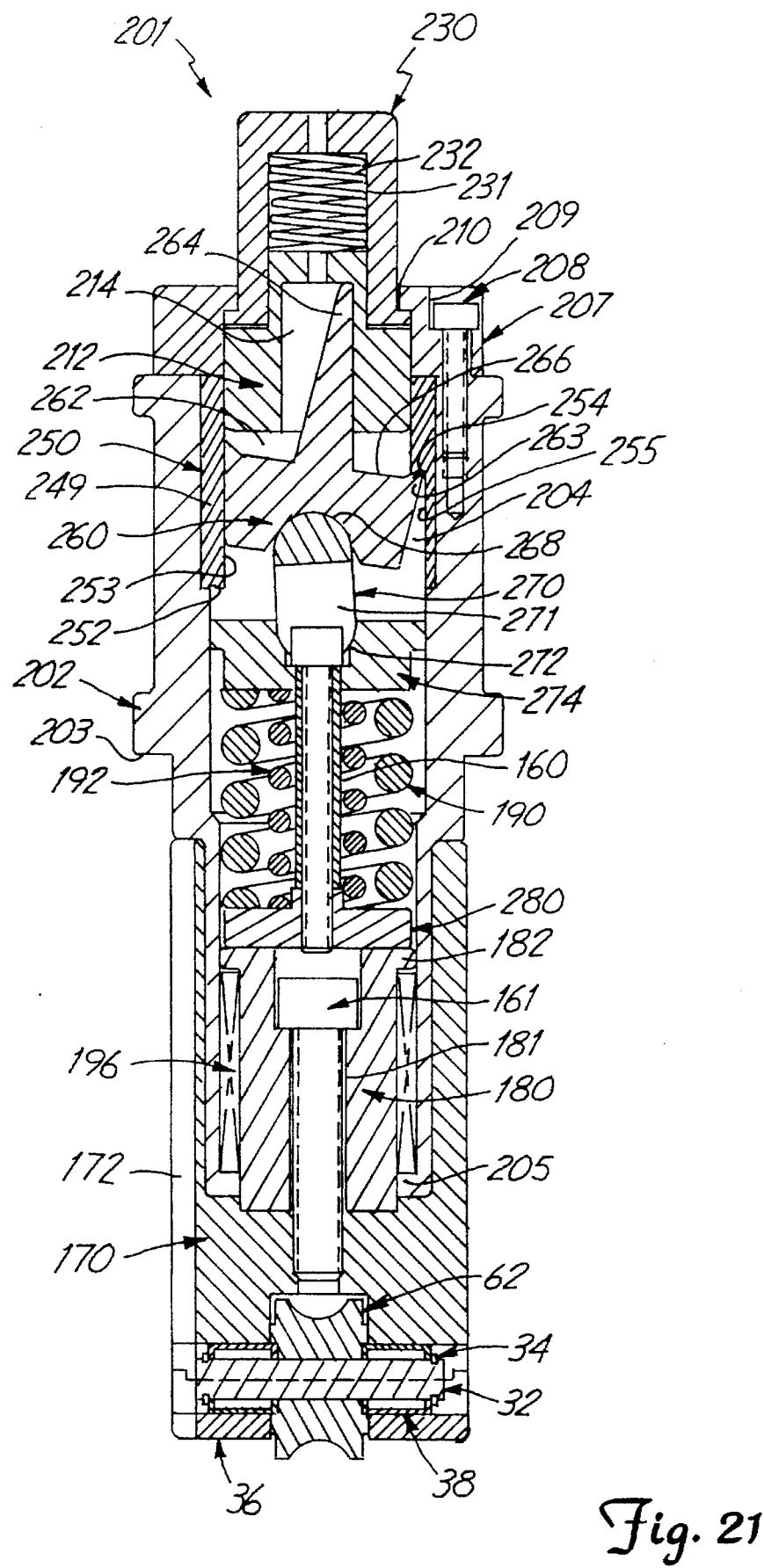
FIG. 21 is a cross-sectional view of another embodiment of a self-locking workpiece-deforming tool of the invention.
Figure 28:
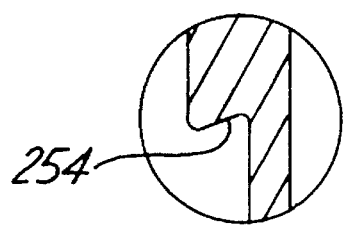
FIG. 28 is a blow-up view of another portion of the sleeve of FIG. 25.
Figure 25A:
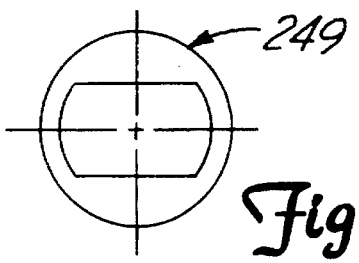
FIG. 25A is a top view of the sleeve of FIG. 25.
Figure 25:
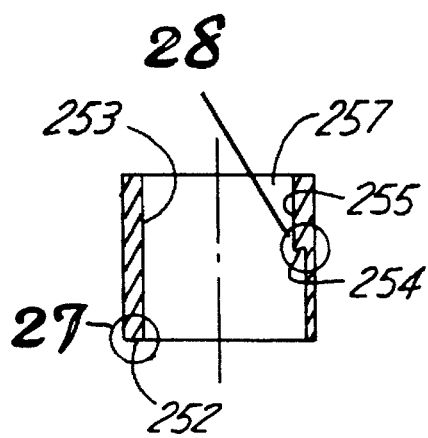
FIG. 25 is a cross-sectional view of a sleeve of a positioning means for use in a self-locking workpiece-deforming tool of FIG. 21.
Figure 27:
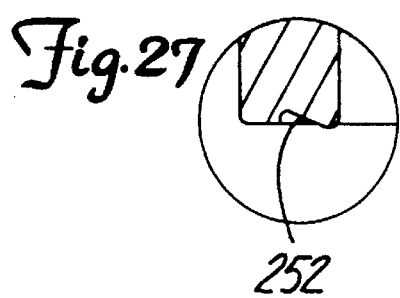
FIG. 27 is a blow-up view of a portion of the sleeve of FIG. 25.
Figure 26:
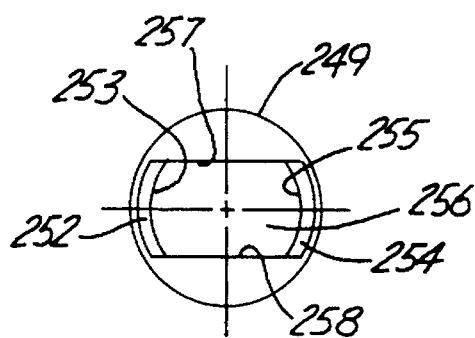
FIG. 26 is a bottom view of the sleeve of FIG. 25.

FIG. 21 depicts another preferred embodiment of a punch tool 201 for use in a punch press in which the ram does not supply a continuous downward pressure against the punch tool. The punch tool 201 is similar to punch tool 200, and like parts are designated by like reference numbers. The punch tool 201 includes a punch guide 202 having an interior surface which defines a chamber 204. A cap 207 having a recess 209 and an opening 210 is secured to the top of the punch guide by a set screw 208.

A head driver 230 and an upper segment 212 of the punch body are received within the cavity 209 for axial reciprocal movement within the cavity 209 and chamber 204. A head spring 231 is positioned in a cavity 232 between the head driver 230 and the upper segment 212.

A positioning means 250, which includes the upper segment 212, a sleeve 249, a pivoting element 260 and a rocker 270, is positioned within the upper portion of the chamber 204. The pivoting element 260 includes a projection 264 extending upwardly from its top surface that is positioned within a cavity 214 of the upper segment 212. The pivoting element 260 also includes first and second detents 262, 263, respectively, located on opposing end walls. The detents 262, 263 extend slightly out from the end walls, and a groove 268 is positioned on the bottom side of the pivoting element 260.

The rocker 270 is positioned so that its upper portion 276 rests in the groove 268 of the pivoting element 260 and its lower end is positioned in a depression 272 in the upper surface of the rocker plate 274. A bolt 160 has its head positioned in a slot 271 of the rocker 270, and passes through an opening through the rocker plate 274. The bolt 160 is threadedly attached to a load plate 280 at its lower end. The first spring 190 is positioned between the rocker plate 274 and the load plate 280, and in a preferred embodiment, the interior spring 192 is concentrically positioned within the first spring 190.

The upper surface of the lower segment 180 is positioned next to the bottom surface of the load plate 280, and the bolt 161 passes through an axial bore 181. The bolt 161 is threadedly connected to a punch holder 170 which carries a workpiece-deforming roller 62 in the same manner as described in FIG. 9.

FIGS. 22–31 show the pivoting element 260, sleeve 249 and rocker 270 in greater detail. Referring to FIGS. 22–24, the pivoting element 260 includes two sides 265, 267; a first detent 262 defining an arc positioned between one end of the sides 265, 267; and a second detent 263 defining an opposing an arc positioned between the other end of the sides 265, 267. In a preferred embodiment, the detents 262 and 263 lie on an imaginary circle defined by the phantom line 269. The pivoting element 260 is not limited to the shape shown on FIGS. 22–24, and may be completely circular so that a single detent projects radially outwardly from the side of the pivoting element. The projection 264 preferably has a generally pyramidal shape with a rectilinear base as shown in FIG. 23.

The sleeve 249 is shown in detail in FIGS. 25–28. The sleeve 249 includes an interior opening 256 that is shaped to receive the pivoting dement 260. The interior opening 256 includes two sidewalls 257, 258 having first and second arcuate end walls 253, 255, respectively. The first arcuate end wall 253 includes a lower catch 252 positioned near its bottom surface, and the second arcuate end wall 255 includes an upper catch 254 positioned above the lower catch 252. In a preferred embodiment, the first detent 262 is engageable with the lower catch 252 and the second detent 263 is engageable with the upper catch 254.

Figure 29:
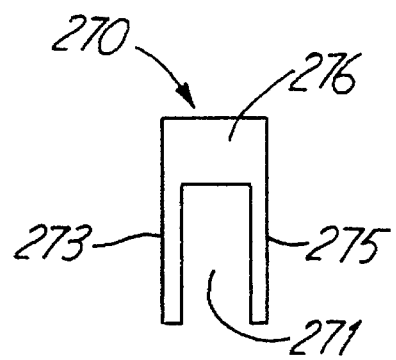
FIG. 29 is a side view of a rocker of an embodiment of the positioning means for use in the self-locking workpiece-deforming tool of FIG. 21.
Figure 30:
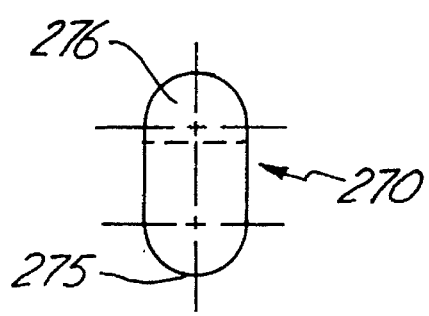
FIG. 30 is a front view of the rocker of FIG. 29.
Figure 31:
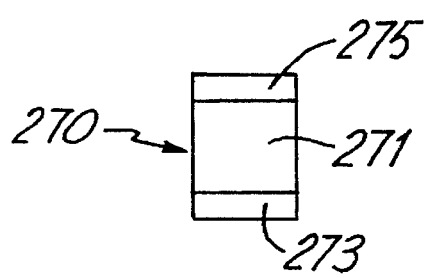
FIG. 31 is a bottom view of the rocker of FIG. 29.

The rocker 270 may include a rounded upper portion 276 from which legs 273, 275 depend downwardly as shown in FIGS. 29–31. The space between the legs 273, 275 defines a slot 271 for receiving the head of the bolt 160.

Figure 32:
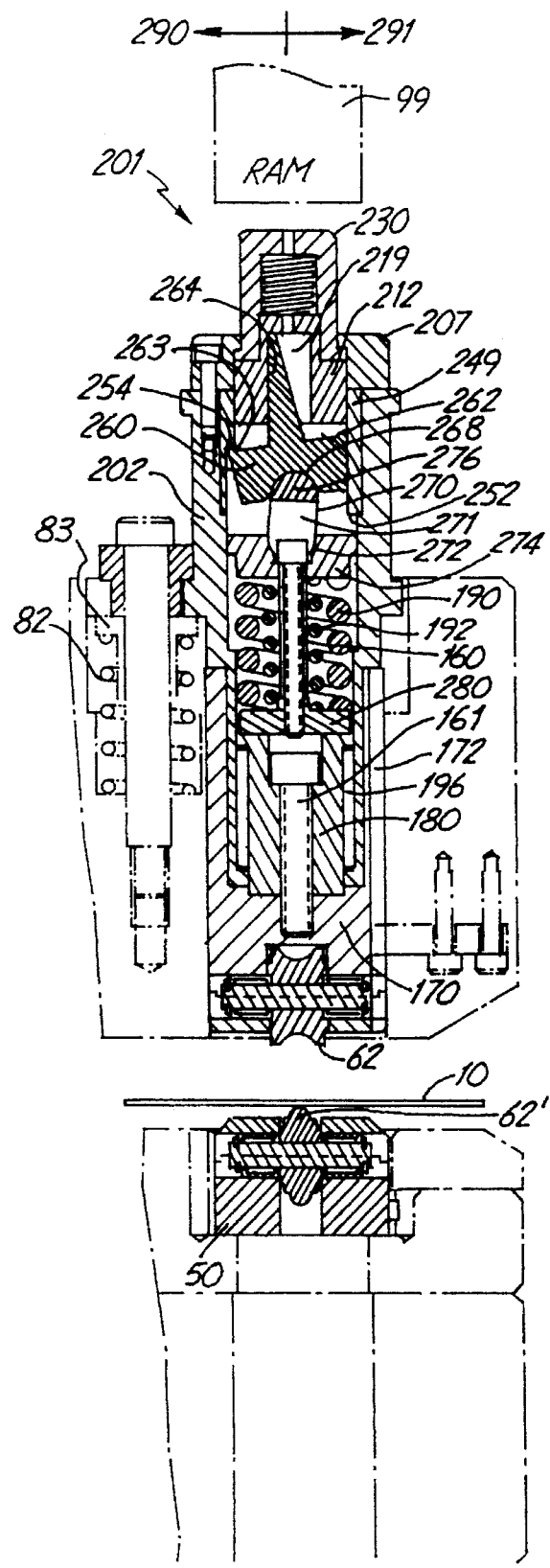
FIG. 32 is a cross-sectional view of a self-locking workpiece-deforming tool of FIG. 21 in a raised position before being engaged by a ram.

The operation of the tool 201 is shown in FIGS. 32–35. FIG. 32 depicts the tool 201 in the raised position without the ram 99 engaging the head driver 230. In the raised position, the second spring 196 urges the lower segment 180 and workpiece-deforming roller 62 upwardly so that they are positioned above the workpiece 10. The upward force of the second spring 196 also urges the rocker plate 274, pivoting element 260 and upper segment 212 upwardly. The pivoting element 260 is positioned to a first side 290 of the vertical so that the second detent 263 engages the upper catch 254, thereby causing the projection 264 to rest against one side of the cavity 214 and the rocker 270 to move slightly to a second side 291 of vertical. The engagement of the second detent 263 and the upper catch 254, and the engagement of the pivoting element 260 with the upper segment 212 and rocker 270, prevents the workpiece-deforming roller 62 from being raised further by the second spring 196.

Figure 33:
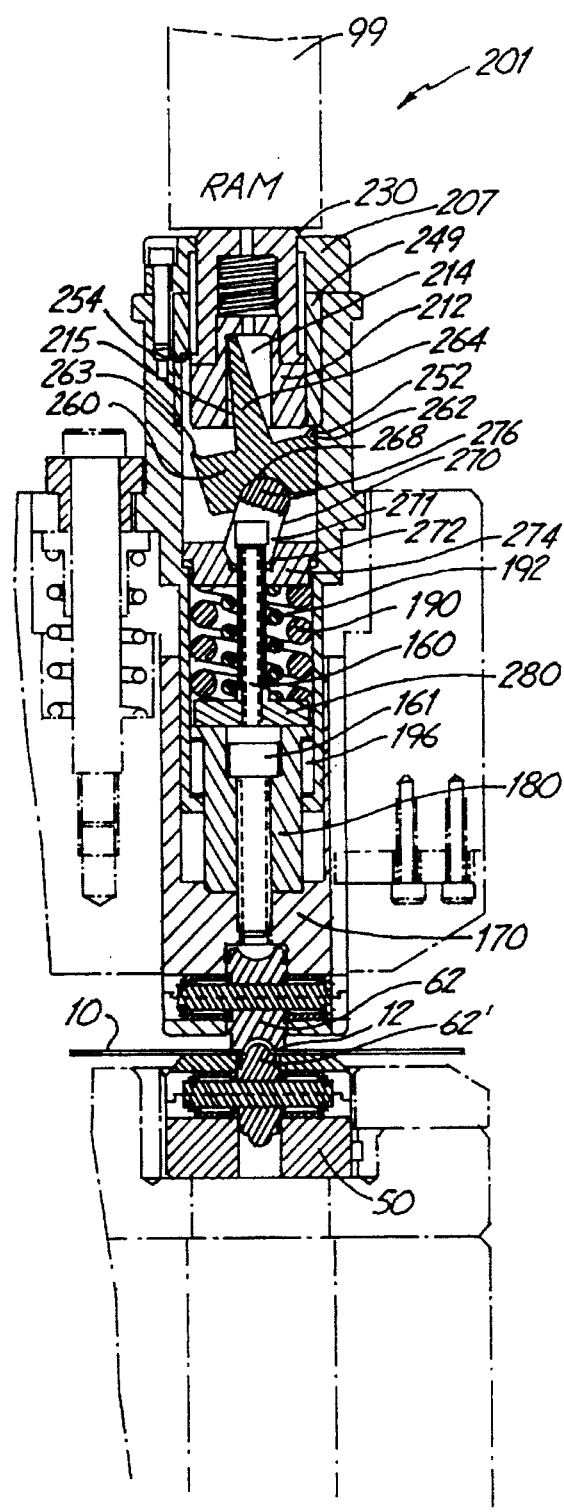
FIG. 33 is a cross-sectional view of the self-locking workpiece-deforming tool of FIG. 21 in a depressed position while being engaged by a ram.

FIG. 33 depicts the tool 201 in its lowermost depressed position with the ram 99 still in engagement with the head driver 230. The downwardly directed force generated by the ram is transmitted through the head element 230, upper segment 212, pivoting element 260, rocker 270, rocker plate 274, first spring 190, intermediate spring 192, load plate 280 and lower segment 180 to the punch holder 170. The second detent 263 of the pivoting element 260 disengages the upper catch 254 as the pivoting element 260 travels downwardly; and as the ram 99 continues to move downwardly, the pivoting element 260 moves to a point where the first detent 262 is lower than the lower catch 252 and the rocker 270 moves further off vertical so that a space 215 is created between the projection 264 and the cavity 214.

Figure 34:
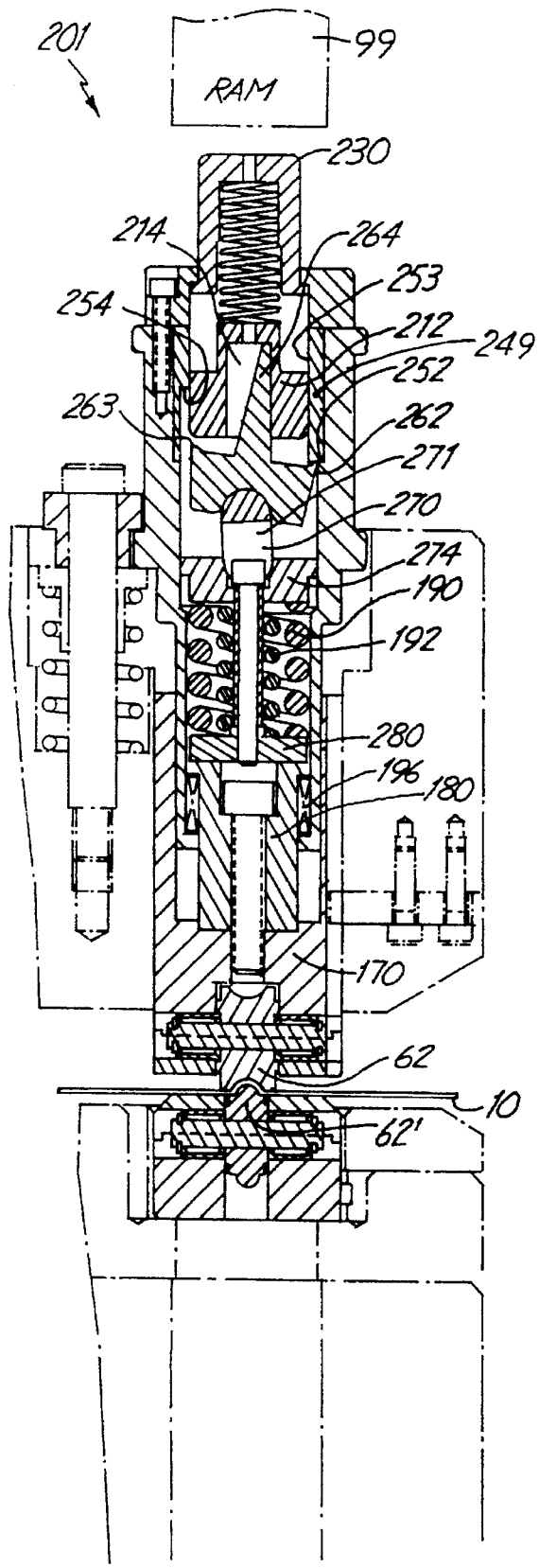
FIG. 34 is a cross-sectional view of the self-locking workpiece-deforming tool of FIG. 21 in a self-locking depressed position without being engaged by the ram.

FIG. 34 depicts the tool 201 in the depressed position, whereby the roller 62 maintains continuous contact with the workpiece 10 without requiting the ram 99 to continuously exert pressure against the head driver 230. After the ram 99 disengages the head driver 230, the first detent 262 engages the lower catch 252 of the sleeve 249 causing the pivoting element 260 to pivot about the top of the rocker 270 to the second side 291 of vertical. The projection 264 shifts to the opposite wall of the cavity 214 as the pivoting element pivots to the second side 291 of vertical, and the rocker 270 moves from the second side 291 of vertical to the first side. The upper segment 212 is maintained in the depressed position by the frictional resistance between its outer wall and the end wall 253. It will be appreciated that the downward pressure that was initially exerted by the ram against the head driver 230 is stored in the first spring 190 and the intermediate spring 192 by preventing the rocker plate 274 from rising above its depressed position when the first detent 262 engages the lower catch 252. The stored energy in the first spring 190 and the intermediate spring 192 is translated through the load plate 280 to the lower segment 180, thereby sustaining the punch holder 170 and the workpiece-deforming roller 62 in the depressed position. A constant load is maintained on the workpiece-deforming roller 62 by the first spring 190 and the interior spring 192 as the workpiece-deforming roller 62 and the coacting roller 62' engage the workpiece 10.

Figure 35:
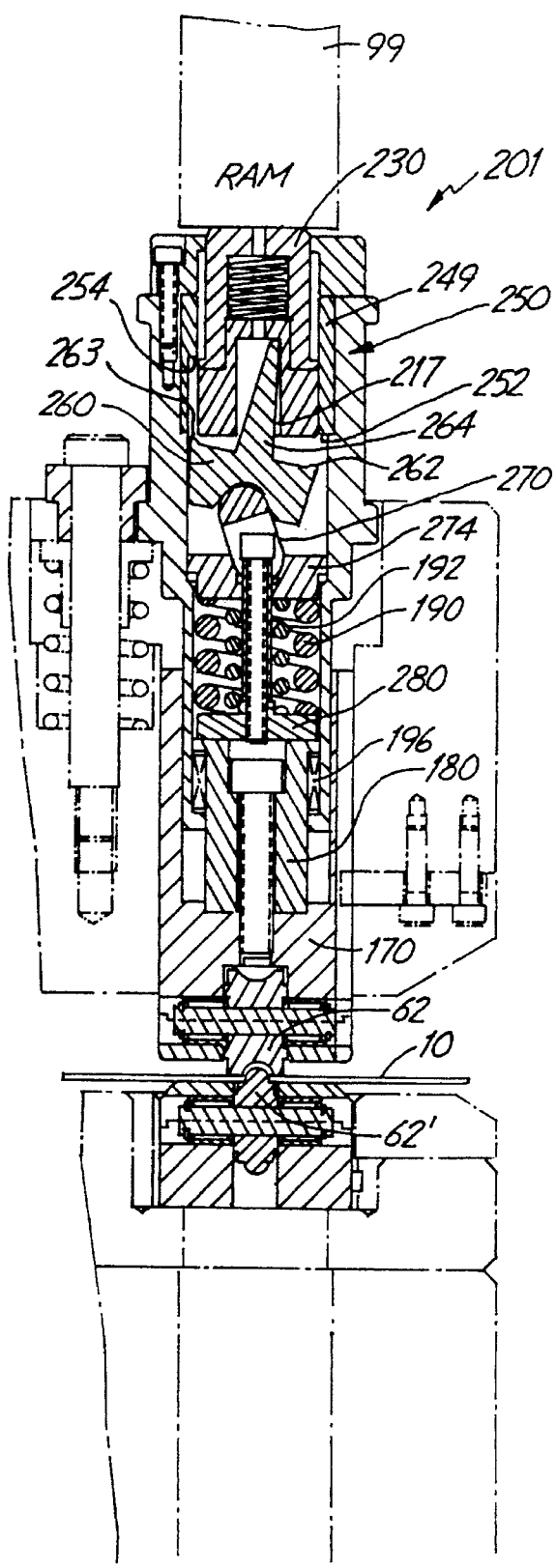
FIG. 35 is a cross-sectional view of the self-locking workpiece-deforming tool of FIG. 21 in which the positioning means is in a released position upon a subsequent strike by a ram.

FIG. 35 depicts the tool 201 being depressed by a ram 91 so that the positioning means 250 is released to allow the workpiece-deforming roller 62 to be moved into the raised position. The downward movement of the ram disengages the first detent 262 from the lower catch 252 and causes the pivoting element 260 and the rocker 270 to move towards the first side 290 of vertical. With the detents 262, 263 being disengaged from both of the catches, the workpiece-deforming roller 62, punch holder 170, lower segment 180 and loading plate 280 are urged upwardly under the influence of the second spring 196. The second spring 196, along with the first spring 190 and intermediate spring 192, urge the rocker plate 274, rocker 270, pivoting element 260 and upper segment 212 into the raised position after the ram 99 begins to move upwardly. After the ram 99 disengages the head driver 230, the constituent parts of the tool 201 are fully moved into the raised position so that the second detent 263 engages the upper catch 254 as shown in FIG. 32.

While a preferred embodiment of the present invention has been described, it should be understood that various changes, adaptations and modifications may be made therein without departing from the spirit of the invention and the scope of the appended claims as the workpiece is translated between the rollers.

We claim:

1. A self-locking workpiece-deforming tool for use in a punch press with a ram, comprising:

an elongated punch guide having an interior surface defining a chamber extending therethrough;

a punch body having an upper end and a lower end, the body being at least partially received within the chamber for reciprocal axial movement with respect to the guide between a raised position and a workpiece-deforming depressed position, the body being lockable in the depressed position and releasable to the raised position;

a rotatable workpiece-deforming roller carried by the lower end of the body for movement between the raised position and the depressed position as the body is reciprocated;

positioning means for sustaining the body and rotatable workpiece-deforming roller in the depressed position without continuous pressure being exerted against the body by the ram, the positioning means locking the body and the rotatable workpiece-deforming roller in the depressed position upon a momentary strike by the ram and releasing the body in the rotatable workpiece-deforming roller to the raised position upon a subsequent momentary strike by the ram; and biasing means for transmitting force from the guide to the body and for urging the body and the rotatable workpiece-deforming roller into the raised position after the positioning means is released.

2. The self-locking workpiece-deforming tool of claim 1, wherein:

the chamber includes an upper portion and a lower portion;

the punch body further comprises an upper segment positioned at least partially within the upper portion of the chamber and a lower segment positioned at least partially within the lower portion of the chamber, wherein the lower segment carries the rotatable workpiece-deforming roller; and the biasing means further comprises a first spring operatively positioned between the upper segment and the lower segment for transmitting pressure therebetween and a second spring operatively positioned between the lower segment and the guide for urging the lower segment and the upper segment into the raised position after the locking means is released.

3. The self-locking workpiece-deforming tool of claim 2, wherein the positioning means includes:

a sleeve positioned between the upper segment and the chamber, the sleeve having a plurality of channels and a plurality of stops alternating with one another around an interior surface of the sleeve, each stop having two sloped bottom surfaces and an indent;

a head driver positioned partially within and extending upwardly through the upper portion of the chamber, the head driver having a radial detent positioned in one of the channels and a plurality of teeth on its lower surface, each tooth having a notch and an inclined surface, the inclined surface being positioned at an angle substantially equal to the sloped bottom surfaces of the sleeve; and the upper segment of the body, which includes a radially extending flange having a slanted upper face positioned at an angle substantially equal to the sloped bottom surfaces of the sleeve, the flange being positioned in one of the channels in the raised position and an indent of one of the stops in the depressed position.

4. The self-locking workpiece-deforming tool of claim 2, wherein the positioning means comprises:

a sleeve having an upper catch and a lower catch;

a pivoting element having a projection extending upwardly into a recess in the upper segment, a detent on the base for alternatingly engaging the upper and lower catches and a groove in the bottom surface;

a rocker having an upper portion positioned in the groove of the pivoting element and legs depending downwardly from the upper portion, the legs being positioned in a depression on a plate resting on top of the first spring; and wherein the detent engages the upper catch in the raised position for maintaining the body and roller in the raised position, and upon a subsequent strike by the ram the detent engages the lower catch for sustaining the body and roller in the depressed position.

5. A self-locking workpiece-deforming tool comprising:

an elongated punch guide having an interior surface defining a chamber extending therethrough, the chamber having an upper portion and a lower portion;

a punch body having an upper segment positioned at least partially within the upper portion of the chamber and a separate lower segment positioned at least partially within the lower portion of the chamber, the upper and lower segments being reciprocally axially moveable with respect to the guide between a raised position and a workpiece-deforming depressed position, the body being lockable in the depressed position and releasable to the raised position;

a punch holder carried by the lower segment, the punch holder being reciprocally axially moveable with respect to the guide;

a rotatable workpiece-deforming roller carried by the punch holder for movement between the raised position and the depressed position as the body and holder are reciprocated;

positioning means for sustaining the body and rotatable workpiece-deforming roller in the depressed position without continuous pressure being exerted against the body by the ram, the positioning means locking the body and the rotatable workpiece-deforming roller in the depressed position upon a momentary strike by the ram and releasing the body in the rotatable workpiece-deforming roller to the raised position upon a subsequent momentary strike by the ram; and biasing means for transmitting force from the driver to the body and for urging the body and the rotatable workpiece-deforming roller into the raised position after the positioning means is released; the biasing means including a first spring operatively positioned between the upper segment and the lower segment for transmitting pressure therebetween and a second spring operatively positioned between the lower segment and the guide for urging the lower segment and the upper segment into the raised position after the locking means is released.

6. The self-locking workpiece-deforming tool of claim 5, wherein the positioning means includes:

a sleeve positioned between the upper segment and the chamber, the sleeve having a plurality of channels and a plurality of stops alternating with one another around an interior surface of the sleeve, each stop having two sloped bottom surfaces and an indent;

a head driver positioned partially within and extending upwardly through the upper portion of the chamber, the head driver having a radial detent positioned in one of the channels and a plurality of teeth on its lower surface, each tooth having a notch and an inclined surface, the inclined surface being positioned at an angle substantially equal to the sloped bottom surfaces of the sleeve; and the upper segment of the body, which includes a radially extending flange having a slanted upper face positioned at an angle substantially equal to the sloped bottom surfaces of the sleeve, the flange being positioned in one of the channels in the raised position and an indent of one of the stops in the depressed position.

7. The self-locking workpiece-deforming tool of claim 5, wherein the positioning means comprises:

a sleeve having an upper catch and a lower catch;

a pivoting element having a projection extending upwardly into a recess in the upper segment, a detent on the base for alternatingly engaging the upper and lower catches and a groove in the bottom surface;

a rocker having an upper portion positioned in the groove of the pivoting element and legs depending downwardly from the upper portion, the legs being positioned in a depression on a plate resting on top of the first spring; and wherein the detent engages the upper catch in the raised position for maintaining the body and roller in the raised position, and upon a subsequent strike by the ram the detent engages the lower catch for sustaining the body and roller in the depressed position.

* * * * *